United States Patent
Ryan

[15] 3,662,800
[45] May 16, 1972

[54] FEED CONVEYOR FLIGHT

[72] Inventor: Kelly P. Ryan, Blair, Nebr.

[73] Assignee: Blair Manufacturing Co., Inc.

[22] Filed: Jan. 30, 1970

[21] Appl. No.: 7,147

[52] U.S. Cl. ..........................................146/129 R, 198/195
[51] Int. Cl. .........................................................B26d 1/04
[58] Field of Search..............198/168, 195, 197; 214/17 DA, 214/17 DB; 259/DIG. 31; 146/129 R

[56] References Cited

UNITED STATES PATENTS 926,806   7/1909   English ...................................198/197

Primary Examiner—Evon C. Blunk
Assistant Examiner—Alfred N. Goodman
Attorney—Hofgren, Wegner, Allen, Stellman & McCord

[57] ABSTRACT

A flight construction for use in a conveyor for conveying feed from a collection thereof. The flight is arranged to mix the feed by integral self-cleaning means adapted to break up the feed such as by a tearing or cutting operation.

9 Claims, 4 Drawing Figures

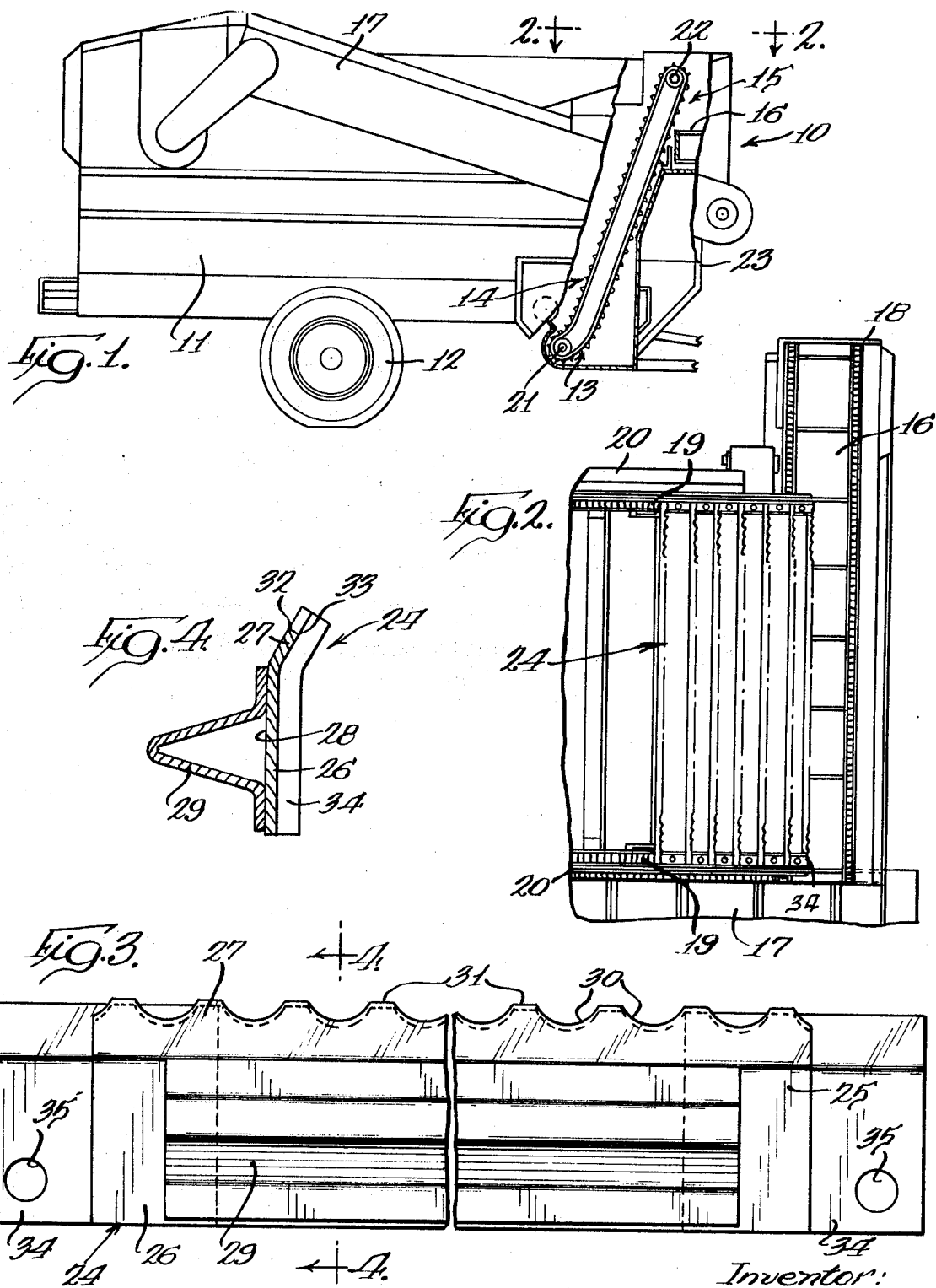

000

FEED CONVEYOR FLIGHT

BACKGROUND OF THE INVENTION

1. Field of the Invention

This invention relates to feed conveyors and in particular to flight structures for use with such feed conveyors.

2. Description of the Prior Art

In feed wagons utilized in feed yards and the like where cattle are temporarily maintained prior to shipment to a slaughterhouse, mixtures of different cattle feeds are provided by suitable mixing and conveying means associated with the wagons. Illustratively, layers of cattle feed, such as corn, alfalfa, molasses, vitamins, and other ingredients such as antibiotics, are mixed by the mixing means provided in the wagon and delivered as desired by the conveying means associated therewith. It is important to produce a uniform, homogeneous mixture of the feed ingredients so as to provide uniform feeding of the cattle. To effect such uniformity in the mixture, it is desirable to break up relatively large feed components such as corn, and to break up clumps of the feed material which may form from time to time.

SUMMARY OF THE INVENTION

The present invention comprehends an improved conveyor structure such as for use in a feed wagon, said conveyor structure having a novel flight means for conveying feed from a collection thereof such as a layered deposit in the feed wagon body, said conveyor further effecting a desirable mixing and breaking up of the feed for delivering a substantially uniform feed mixture as desired.

The flight means includes an arcuately notched leading edge portion providing desirable breaking up and mixing of the feed ingredients. The flights are adapted to convey the feed from a collection thereof, such as in the body of the wagon, to a discharge position. Illustratively, the feed may be returned from the discharge position back into the feed wagon body for further mixing, or may be delivered from the discharge position by suitable conveyor means for use in feeding the cattle.

The flight structure is defined by arcuate spaced notches formed in a turned edge portion thereof. The notches may comprise segmentally circular notches and may be effectively spaced rearwardly of the plane of a flat base portion of the flight. The flights may be secured to the chain drive means of the conveyor by suitable connector plates secured at the opposite ends thereof.

BRIEF DESCRIPTION OF THE DRAWING

Other features and advantages of the invention will be apparent from the following description taken in connection with the accompanying drawing wherein:

FIG. 1 is a side elevation of a feed wagon having a conveyor structure embodying the invention, with portions broken away to facilitate illustration of the invention;

FIG. 2 is a fragmentary top plan view of the conveyor portion of the wagon;

FIG. 3 is a broken elevation of a flight embodying the invention for use in the conveyor; and FIG. 4 is a vertical section thereof taken substantially along the line 4—4 of FIG. 3.

DESCRIPTION OF THE PREFERRED EMBODIMENT

In the exemplary embodiment of the invention as disclosed in the drawing, a feed wagon generally designated 10 is shown to comprise a wagon having a body portion 11 adapted to receive feed material such as corn, alfalfa, etc. The wagon may be provided with suitable wheels 12 for facilitated movement thereof as desired.

Mixing of the feed may be effected in the wagon at least in part by a conveyor generally designated 13 which conveys the collected feed upwardly from a collection position 14 to a discharge position 15. The discharged feed may be transferred from the discharge position by means of a conveyor 16 which may alternatively deliver the mixed feed to a third conveyor 17 for return back into the wagon body 11 for further mixing, or to a chute 18 for delivery from the wagon.

Conveyor 13 includes a pair of chains 19 at the opposite sides 20 of the wagon body 11. The chains are driven by a pair of sprockets 21 and 22. The conveyor as seen in FIG. 1 extends in a forwardly upwardly direction at the forward end 23 of the wagon. Secured to the chains is a series of flights 24 adapted to move upwardly through the collected feed and concurrently convey, mix, and break up the collected feed to provide an improved mixing-conveying action.

The construction of flights 24 is best seen by reference to FIGS. 3 and 4 wherein the flight is seen to comprise a sheet metal member 25 having a base portion 26 and a turned upper edge portion 27. On the front face 28 of base portion 26 is mounted a V-shaped lift member 29. Upper edge portion 27 is turned rearwardly from the flat plane of base portion 26 at a substantial angle, such as approximately 30° as best seen in FIG. 4.

Edge portion 27 is defined by a series of arcuate notches 30 which are spaced apart to define rectilinear lands 31 therebetween. The notches, by virtue of the rearwardly turned edge portion, are spaced rearwardly of the plane of the base portion 26. The notches may be segmentally circular and in the illustrated embodiment, are less than semi-circular so as to define relatively shallow, self-cleaning notches. The front edge 32 and the rear edge 33 of the notches are preferably squared to define means for cutting or tearing up the feed, thereby to provide improved homogeneity in the mixture. Illustratively, where the feed comprises corn, the serrated edge portion 27 effectively tears the corn into small portions for improved facilitated mixing.

Illustratively, member 25 may be formed of 11-gauge hot rolled steel having an original width of 2-13/16 inches with the edge portion 27 extending approximately three-fourths inch and the over-all height of member 25 being approximately 2¾ inches. Lifts 29 may similarly be formed of 11-gauge hot rolled steel and may project forwardly from surface 28 approximately 1 ⅜ inches. The opposite ends of member 25 are secured as by welding a pair of connector plates each provided with a suitable mounting 35 for use in connection thereof to the chain 19. As seen in FIG. 3, the connector plates may overlie a portion of the notches 30 at the opposite ends of member 25.

Illustratively, the over-all length of flight 24 may be approximately 4 feet or 5 feet. Where the flight comprises a nominal 4-ft. flight, the actual length may be approximately 43-5/8 inches with the length of the lift 29 being approximately 39 inches, the length of member 25 being approximately 40¾ inches, and the length of the connector plates being approximately 3 inches. The connector plates may comprise ¼ inch bar stock.

Thus, in use, conveyor 13 moves through the collection of feed in the wagon body 11 to lift the feed upwardly to the discharge position 15 while at the same time the edge portion 27 effects a breaking up of the feed into reduced portions for improved uniformity in the mixing thereof. Notches 30 are self-cleaning thereby permitting continuous operation of the conveyor while providing the improved conveying-mixing functioning. The flight structure is extremely simple and economical of construction while yet providing long, trouble-free life.

The foregoing disclosure of specific embodiments is illustrative of the broad inventive concepts comprehended by the invention.

I claim:

1. In a conveyor for conveying feed from a collection thereof, said conveyor having chain means movable along a preselected conveying path extending through said collection of feed, a plurality of flights carried by said chain means for movement therewith to pass upwardly through said feed collection to mix and convey the feed to a discharge position, said flights comprising a rigid member having an upright base portion and a feed supporting portion projecting laterally forwardly from said base portion having an upwardly facing surface defining the bottom of an overlying space forwardly of said base portion, and means carried by the flights for cutting and tearing the feed as an incident of movement of the flights through the collection of feed defined by a leading upper edge portion of said flights turned rearwardly from said overlying space and defined by a series of spaced arcuate notches.

2. The feed conveyor flight structure of claim 1 wherein the flight comprises a sheet metal element having a flat base portion and means for connecting the base portion to said chain means, and said edge portion comprises a portion of said element turned out of the plane of the base portion and including an inner end free of notches.

3. The feed conveyor flight structure of claim 2 wherein said edge portion is turned out an angle of approximately 30° to the plane of the base portion.

4. The feed conveyor flight structure of claim 1 wherein said edge defines rectilinear lands between said notches.

5. The feed conveyor flight structure of claim 1 wherein the flight includes connector plates extending outwardly from the opposite ends of said series of notches secured to said chain means.

6. The feed conveyor flight structure of claim 5 wherein said plates overlie a portion of said notches.

7. The feed conveyor flight structure of claim 1 wherein said notches are segmentally circular.

8. The feed conveyor flight structure of claim 7 wherein the notches are substantially less than semi-circular.

9. The feed conveyor flight structure of claim 1 wherein the notches are square at their front and rear edges.

* * * * *